US012775613B2

(12) United States Patent
Lanfranchi et al.

(10) Patent No.: US 12,775,613 B2
(45) Date of Patent: Oct. 27, 2026

(54) SQL FIXIT—AUTOMATED GENERATION OF FINE-TUNING DATA USING LLMS

(71) Applicant: Oracle International Corporation, Redwood Shores, CA (US)

(72) Inventors: Clemence Lanfranchi, Zurich (CH); Damien Hilloulin, Zurich (CH); Rhicheek Patra, Zurich (CH); Sungpack Hong, Palo Alto, CA (US); Hassan Chafi, Zurich (CH); Yakupitiyage Don Dharmasir, Melbourne (AU); Cong Duy Vu Hoang, Melbourne (AU); Gioacchino Tangari, Sydney (AU); Thanh Vu, Brisbane (AU); Thanh Long Duong, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/820,708

(22) Filed: Aug. 30, 2024

(65) Prior Publication Data

US 2026/0064671 A1 Mar. 5, 2026

(51) Int. Cl.
*G06F 16/242* (2019.01)
*G06F 16/21* (2019.01)
*G06F 16/23* (2019.01)

(52) U.S. Cl.
CPC .......... *G06F 16/243* (2019.01); *G06F 16/212* (2019.01); *G06F 16/2365* (2019.01)

(58) Field of Classification Search
CPC ... G06F 16/243; G06F 16/212; G06F 16/2365
See application file for complete search history.

(56) References Cited

U.S. PATENT DOCUMENTS

| | | | | |
|---|---|---|---|---|
| 7,293,008 | B2 | 11/2007 | Potter | |
| 9,495,398 | B2 | 11/2016 | Parkkinen | |
| 12,271,374 | B1 * | 4/2025 | Lai ........................ | G06F 16/242 |

(Continued)

OTHER PUBLICATIONS

Wang et al., "Self-Instruct: Aligning Language Models with Self-Generated Instructions", Proceedings of the 61st Annual Meeting of the Association for Computational Linguistics (vol. 1: Long Papers) 23 pages (May 25, 2023).

(Continued)

*Primary Examiner* — Jensen Hu
(74) *Attorney, Agent, or Firm* — Hickman Becker Bingham Ledesma LLP

(57) ABSTRACT

Here is an innovative way to generate a finetuning corpus that maximizes the accuracy of a target large language model (LLM) that generates a database statement. From a natural language request, the target LLM infers an incorrect database statement that, based on a first database schema, could not satisfy a technical requirement. Based on the natural language request, a correct database statement is generated that, based on a second database schema, could satisfy the technical requirement. For the second database schema, a restatement of the natural language request is generated. In inputs during finetuning, the target LLM accepts: the correct database statement, the incorrect database statement, and the restatement of the natural language request.

22 Claims, 7 Drawing Sheets

(56) References Cited

U.S. PATENT DOCUMENTS

| | | | | |
|---|---|---|---|---|
| 2005/0043940 | A1 * | 2/2005 | Elder | G06F 16/24522 704/9 |
| 2012/0054217 | A1 | 3/2012 | Clarke | |
| 2020/0356594 | A1 | 11/2020 | Liu | |
| 2021/0019312 | A1 | 1/2021 | Shaik | |
| 2022/0414344 | A1 * | 12/2022 | Makki Niri | G06F 40/30 |
| 2023/0359649 | A1 | 11/2023 | Wallack et al. | |
| 2024/0160858 | A1 * | 5/2024 | Dai | G06F 40/40 |
| 2024/0256423 | A1 * | 8/2024 | Zhang | G06F 8/71 |
| 2024/0330603 | A1 * | 10/2024 | Tu | G06F 40/47 |
| 2024/0378399 | A1 * | 11/2024 | Gandhi | G06F 16/345 |
| 2025/0013827 | A1 * | 1/2025 | Chu | G06F 40/284 |
| 2025/0045256 | A1 * | 2/2025 | Gottlob | G06F 16/215 |
| 2025/0060944 | A1 * | 2/2025 | Radhakrishna | G06F 40/35 |
| 2025/0094138 | A1 * | 3/2025 | Hu | G06F 40/226 |
| 2025/0165775 | A1 * | 5/2025 | Sathianathan | G06F 8/76 |
| 2025/0190604 | A1 * | 6/2025 | Fu | G06F 16/242 |
| 2025/0217351 | A1 * | 7/2025 | Tan | G06F 16/2423 |
| 2025/0258819 | A1 * | 8/2025 | Jain | G06F 40/279 |
| 2025/0272541 | A1 * | 8/2025 | Yan | G06N 3/0455 |

OTHER PUBLICATIONS

Suhara et al., "Annotating cols. with Pre-trained Language Models" downloaded from https://arxiv.org/pdf/2104.01785.

Meyer, "Gretel AI work on generating synthetic Text-to-SQL dataset" dowloaded https://gretel.ai/blog/synthetic-text-to-sql-dataset—14 pages (Apr. 4, 2024).

Luo et al. "WizardCoder: Empowering Code Large Language Models with Evol-Instruct." The Twelfth International Conference on Learning Representations. 13 pages (Jun. 14, 2023).

Chen et al. "Self-play fine-tuning converts weak language models to strong language models." arXiv preprint arXiv:2401.01335 22 pages (Jun. 14, 2024).

Zhou et al., "Large language models are human-level prompt engineers" arXiv preprint arXiv:2211.01910 (2022).

Yu et al., "Spider: A large-scale human-labeled dataset for complex and cross—domain semantic parsing and text-to-sql task" arXiv preprint arXiv:1809.08887 (2018).

Wang et al., "Mac-sql: Multi-agent collaboration for text-to-sql" arXiv preprint arXiv:2312.11242 (2023).

Rajkumar et al., "Evaluating the text-to-sql capabilities of large language models" arXiv preprint arXiv:2204.00498 (2022).

Pourreza et al., "Din-sql: Decomposed in-context learning of text-to-sql with self-correction" Advances in Neural Information Processing Systems, 36 (2024).

Luo et al. "WizardCoder: Empowering Code Large Language Models with Evol-Instruct." The Twelfth International Conference on.

Li et al., "StarCoder: may the source be with you!" arXiv preprint arXiv:2305.06161 (2023).

Li et al., "Enhancing Text2SQL Generation with Syntactic Information and Multi-task Learning". In International Conference on Artificial Neural Networks (pp. 377-388). Cham: Springer Nature Switzerland (Sep. 2023).

Li et al., "Can llm already serve as a database interface? a big bench for large-scale database grounded text-to-sqls" Advances in Neural Information Processing Systems, 36.(2024).

Gao et al., "Text- to-sql empowered by large language models: A benchmark evaluation" arXiv preprint arXiv:2308.15363 (2023).

"DefogAI, SQLCoder" dowloaded https://defog.ai/blog/open-sourcing-sqlcoder2-7b/ (2022).

Bergmann, "What is fine-tuning" IBM https://www.ibm.com/think/topics/fine-tuning dated Mar. 15, 2024 (11 pages).

Vaidya et al., "TailorSQL: An NL2SQL System Tailored to Your QueryWorkload"; May 29, 2025; 13 pages; available: https://arxiv.org/abs/2505.23039.

Makai, "Object-relational Mappers (ORMs)", Full Stack Python; available: https://www.fullstackpython.com/object-relational-mappers-orms.html; retrieved on Oct. 22, 2025.

Bird-Bench, "Bird-SQL", available: https://bird-bench.github.io/; downloaded: Aug. 29, 2025.

Amazon, "Interacting with Amazon Q generative SQL", available: https://docs.aws.amazon.com/redshift/latest/mgmt/query-editor-v2-generative-ai.html#query-editor-v2-generative-custom-context; downloaded: Aug. 29, 2025.

Prompting Large Language Model for Machine Translation-A Case Study, Biao et al., (Year: 2023).

Prompting a Large Language Model to Generate Diverse Motivational Messages, Samuel et al., (Year: 2023).

Lexicon-based prompt for financial dimensional sentiment analysis, Wei Lin (Year; 2024).

Error Analysis Prompting Enables Human-Like Translation Evaluation in Large Language Models—A Case Study on ChatGPT, Qingyu Lu (Year: 2023).

* cited by examiner

FIG. 3

NL QUESTIONS 300

| Issue_id | Schema | Nl_prompt | Base_nl_prompt |
|---|---|---|---|
| join_00 | Schema | Calculate the average life expectancy of count | Calculate the average life expectancy of countrie |
| join_00 | Schema | Determine the mean value of the life expectan | Calculate the average life expectancy of countries |
| join_00 | Schema | What is the average lifespan in the Southern a | Calculate the average life expectancy of countries |
| join_00 | Schema | Find the average life expectancy for countries | Calculate the average life expectancy of countries |
| join_00 | Schema | Compute the average length of life for countries in the Southern and Central Asia continent. | Calculate the average life expectancy of countries |
| join_00 | Schema | Calculate the mean value of the life expectanc | Calculate the average life expectancy of countries |
| join_00 | Schema | Get the capital names and the population of ex | Get the capital names and the population of each |
| join_00 | Schema | Retrieve the names of all the countries along v | Get the capital names and the population of each |
| join_00 | Schema | Provide the country names, their capital location | Get the capital names and the population of each |
| join_00 | Schema | Obtain the names of each sovereign state, the | Get the capital names and the population of each |

QUESTION PAIR 310

FIG. 4

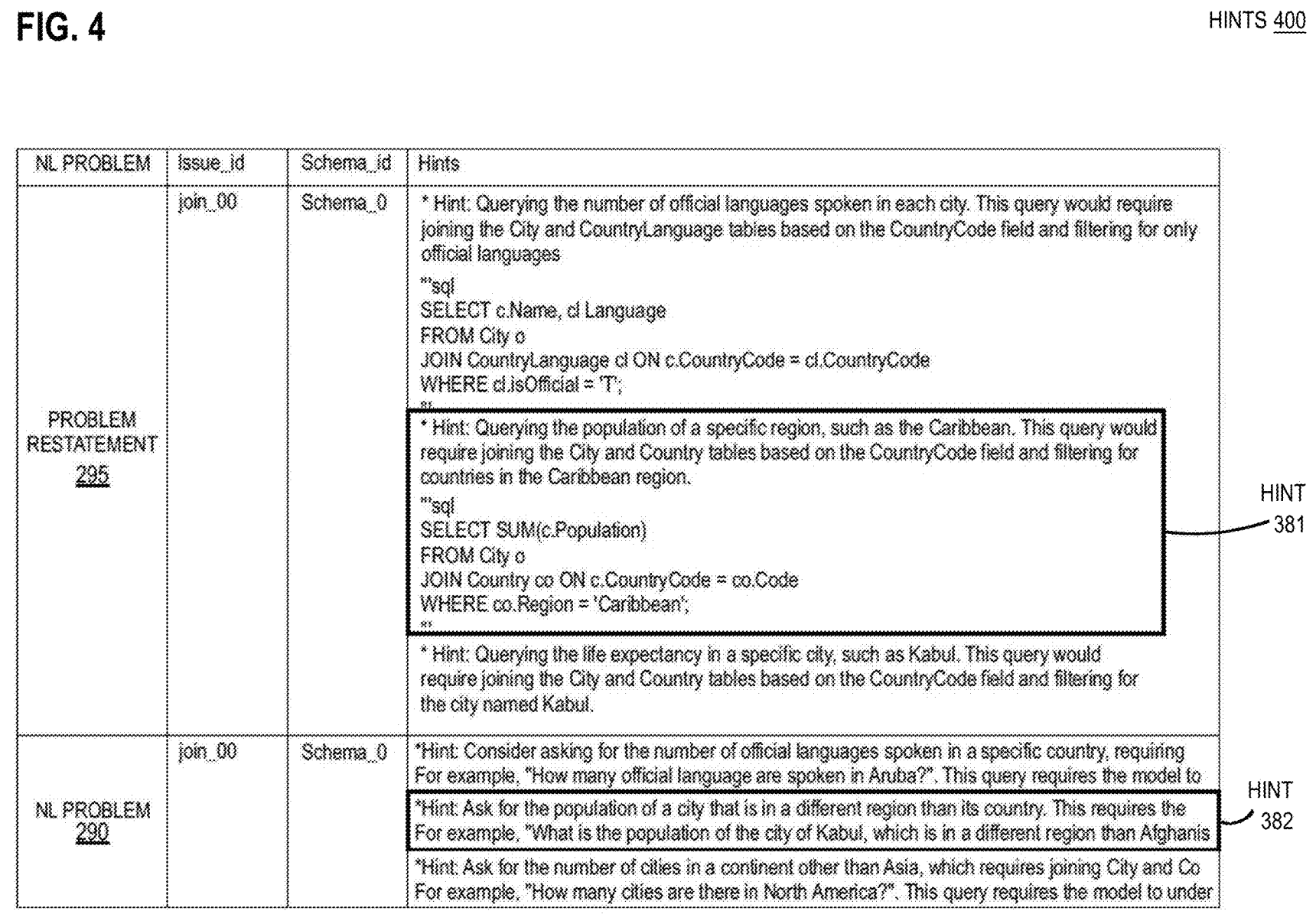

HINTS 400

| NL PROBLEM | Issue_id | Schema_id | Hints |
|---|---|---|---|
| PROBLEM RESTATEMENT 295 | join_00 | Schema_0 | * Hint: Querying the number of official languages spoken in each city. This query would require joining the City and CountryLanguage tables based on the CountryCode field and filtering for only official languages<br>```sql<br>SELECT c.Name, cl Language<br>FROM City c<br>JOIN CountryLanguage cl ON c.CountryCode = cl.CountryCode<br>WHERE cl.isOfficial = 'T';<br>``` |
| | | | * Hint: Querying the population of a specific region, such as the Caribbean. This query would require joining the City and Country tables based on the CountryCode field and filtering for countries in the Caribbean region.<br>```sql<br>SELECT SUM(c.Population)<br>FROM City c<br>JOIN Country co ON c.CountryCode = co.Code<br>WHERE co.Region = 'Caribbean';<br>``` |
| | | | * Hint: Querying the life expectancy in a specific city, such as Kabul. This query would require joining the City and Country tables based on the CountryCode field and filtering for the city named Kabul. |
| NL PROBLEM 290 | join_00 | Schema_0 | *Hint: Consider asking for the number of official languages spoken in a specific country, requiring For example, "How many official language are spoken in Aruba?". This query requires the model to |
| | | | *Hint: Ask for the population of a city that is in a different region than its country. This requires the For example, "What is the population of the city of Kabul, which is in a different region than Afghanis |
| | | | *Hint: Ask for the number of cities in a continent other than Asia, which requires joining City and Co For example, "How many cities are there in North America?". This query requires the model to under |

HINT 381

HINT 382

SQL FIXIT—AUTOMATED GENERATION OF FINE-TUNING DATA USING LLMS

FIELD OF THE INVENTION

The present invention relates to generating a finetuning corpus that maximizes the accuracy of a large language model that generates a database statement.

BACKGROUND

With recent progress made by Large Language Models (LLMs) on coding tasks, there has been a high demand, especially in the enterprise world, for artificial intelligence (AI) models capable of writing Structured Query Language (SQL), which is a popular programming language for interacting with databases in order to extract information and insights from datasets. While some LLMs have already shown impressive performance on Text-to-SQL parsing, which aims at converting natural language instructions into executable SQL, they often exhibit erroneous patterns or tend to consistently fail on specific use cases.

One major way to improve an LLM is to perform supervised finetuning or preference alignment (using techniques such as DPO, Reinforcement Learning, ORPO, etc.) to fix identified problems. However, this fixing step requires a large number of high-quality training Text-to-SQL samples that target the issues to solve, and collecting such samples can be very time and cost intensive because they are usually manually curated by skilled developers. To increase the accuracy of an LLM, a state of the art Text-to-SQL finetuning corpus should contain at least a hundred datapoints. Otherwise, LLM accuracy declines. LLM accuracy may be as follows.

Herein, bidirectional encoder representations for transformers (BERT) and generative pretrained transformer (GPT) are interchangeable or equivalent opensource implementations of a general-purpose LLM that is a pretrained deep neural network (DNN) for natural language (NL) processing (NLP). An LLM is a powerful language model that may rely heavily on the structure and patterns of NL to understand and process meaningful text. Diction and phrasing, being the arrangement of words and phrases in a sentence, significantly affect an LLM's accuracy for the following reasons.

An LLM's contextual comprehension may be affected by semantics such as dependency relationships between words in an NL prompt that the LLM accepts as input. The LLM learns how words relate to each other syntactically, which aids in comprehension of the overall meaning of a sentence. For example, recognizing a subject-verb-object structure helps the LLM infer causes and effects. Syntactic information provides structural clues that help the LLM disambiguate words with multiple meanings by considering the context in which a word is used.

The accuracy of an NL prompt may be measured by measuring the accuracy of an inference from the prompt. That is, natural language may be measurably inaccurate. For example, the accuracy of a generated summary is measurable, where the summary is clear prose (i.e. NL) that is inferred from less clear prose by learned summarization.

The following are supervised (i.e. labeled) and unsupervised ways of measuring accuracy of a generated summary. With a labeled dataset, it is possible to measure summary accuracy quantitatively with the following various NL metrics, including metrics similar to Factuality that measures how much of the generated summary is relevant (i.e. signal, not noise). The following are automatic ways to measure accuracy of a summary.

Bilingual Evaluation Understudy (BLEU) has a scale from 0 to 1 where 0 corresponds to complete inaccuracy and 1 to perfect accuracy. The score is calculated based on the number of matching n-grams (multiword short phrases) using a modified n-gram precision and a brevity penalty to prevent biases.

Recall-Oriented Understudy for Gisting Evaluation (ROUGE) is a set of metrics for comparing the desired output and the reference. It measures the longest matching sequence of words in the two texts.

MPNet measures similarity between two pieces of text as cosine similarity of embedding vectors that represent the text.

The AlignScore metric uses a tuned Robustly Optimized BERT Pretraining Approach (ROBERTa) and a function on the output of the model to output a score between 0 and 1 representing the alignment of two strings of text. This approach is different from the others because it uses an LLM. It uses the embeddings (a compressed representation of the sentence) given as output from the ROBERTa language model.

By the above example accuracy metrics, accuracy of any NL generated herein may be quantified, and this accuracy is a performance measurement of an LLM that generated the NL and a performance measurement of internal operation of a computer that hosts the LLM.

BRIEF DESCRIPTION OF THE DRAWINGS

In the drawings:

FIG. 3 is a block diagram that depicts example natural language (NL) questions;

FIG. 4 is a block diagram that depicts example NL hints;

DETAILED DESCRIPTION

Figure 1:
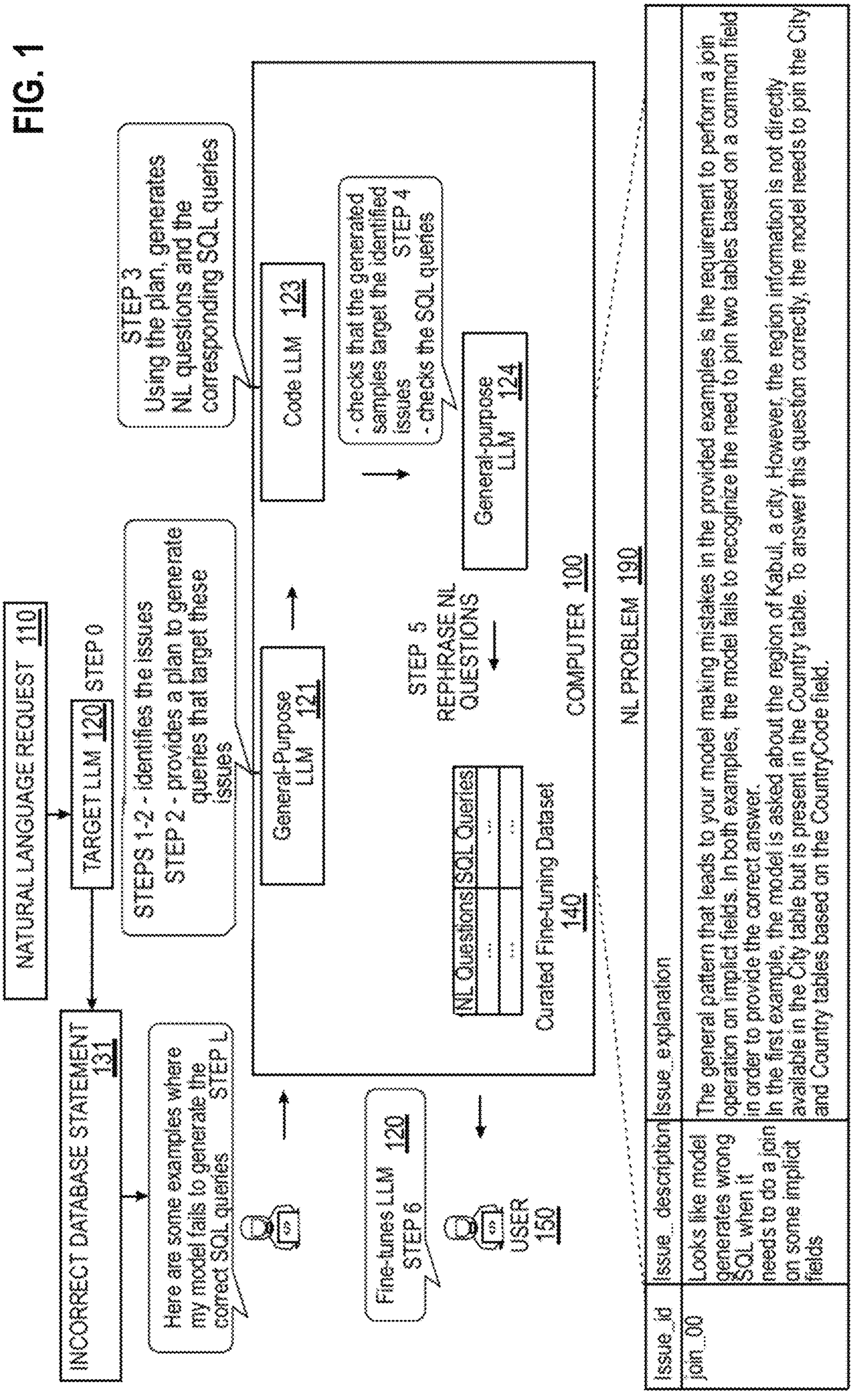
FIGS. 1-2 are block diagrams that depict an example computer that generates a curated finetuning corpus for a target large language model (LLM) that generated an incorrect database statement.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Here is an innovative way to generate a finetuning corpus that maximizes the accuracy of a large language model (LLM) that generates a database statement. This approach is a multistep inference framework for additional LLMs to cooperatively generate data to improve a target LLM on desired issues. This approach leverages a custom chain of prompts as well as self-planning techniques to automatically mass produce high-quality Text-to-SQL data samples that exhibit specific patterns requested by the user, such as the use of complex JOIN queries or the use of structured query language (SQL) aggregate functions in a particular input context. This approach has a novel pipeline that is LLM-wise modular, meaning that any LLM can be used at any stage of the pipeline and is also structure-wise modular, because the pipeline consists of multiple blocks that can be added or removed depending on the needs of the user. The generated data can be used to finetune in a supervised manner or perform preference alignment (e.g. using techniques such as DPO, Reinforcement Learning, ORPO, etc.) on a target LLM to improve the target's performance on Text-to-SQL tasks.

Finetuning data quality is increased herein by syntactic diversity in the generated finetuning corpus. A target LLM's performance is influenced by the syntactic diversity of its finetuning data. A model finetuned on a variety of sentence structures will be better equipped to handle different input patterns. By better processing syntactic information, the target LLM can achieve higher accuracy on a wide range of natural language (NL) processing tasks.

This approach takes as input a description of a use case where the target LLM does not perform well, and automatically generates a finetuning corpus that contains: a) NL prompts that are NL instructions that target the problematic use case, b) corresponding SQL queries that correctly answer the NL instructions, and c) examples of incorrect SQL queries that exhibit the failure pattern of the target LLM. The typical usage scenario for this pipeline is when an LLM developer tries to increase accuracy of a target LLM at SQL generation tasks and have noticed some recurring problems in the LLM's replies that need fixing. The developer wants to obtain a finetuning dataset of Text-to-SQL samples that target the observed problems in order to increase accuracy of the target LLM via supervised finetuning or preference alignment techniques.

This approach has the following innovations. The state of the art does not generate a finetuning corpus on demand to solve a specific set of issues. This approach uses a novel multistep pipeline where each step uses prompts that have been specifically designed to get high accuracy replies from powerful LLMs.

This approach has the following advantages. It facilitates generating training data that targets specific issues, such as specific use cases. This approach requires very little human annotation. State of the art data generation methods usually require a set of at least a hundred examples. The approach herein needs only one to three original examples as input.

1.0 Example Computer

Figure 2:
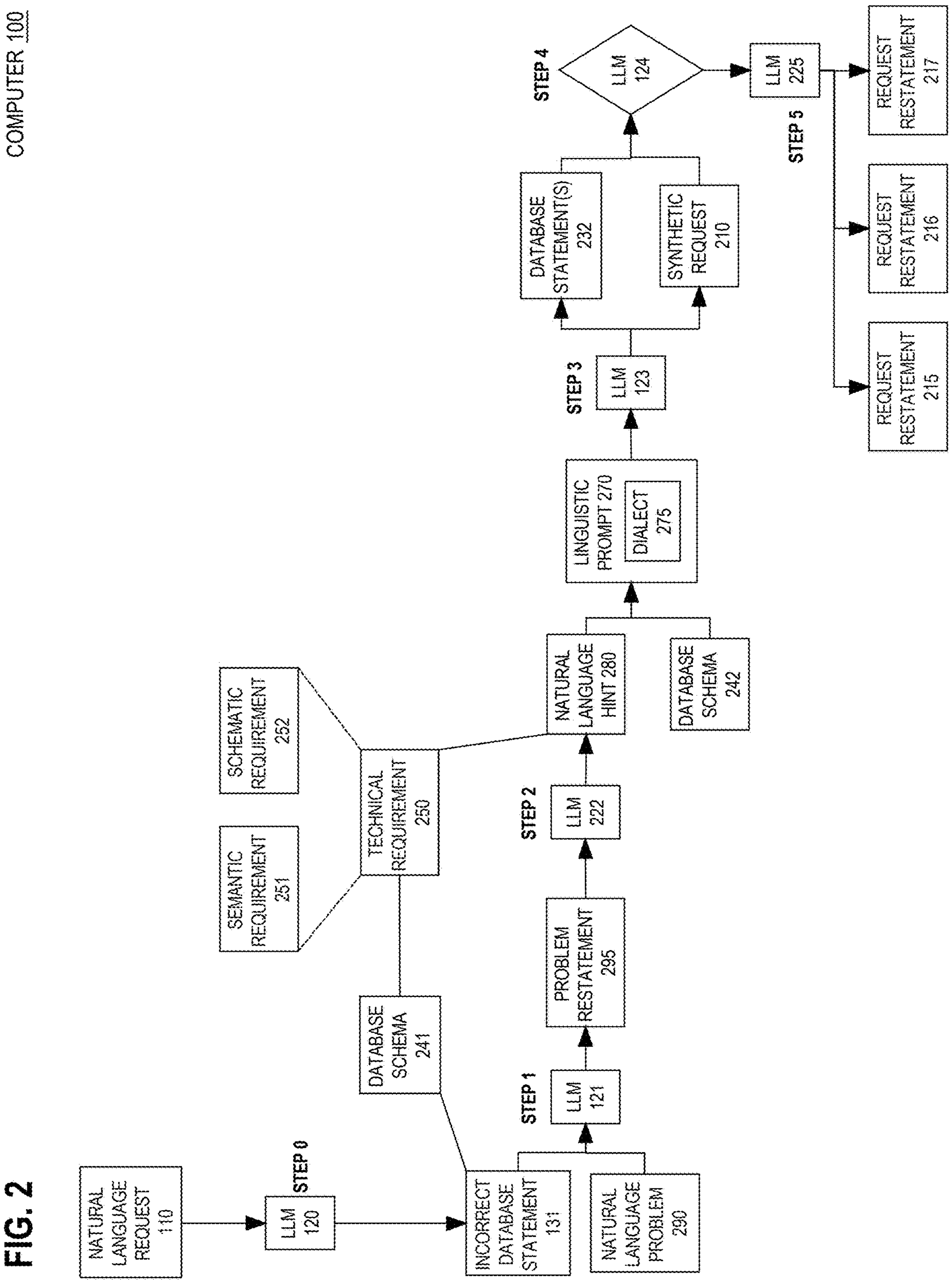

FIG. 1 is a block diagram that depicts an example computer 100 that generates curated finetuning dataset 140 that is a finetuning corpus for FIG. 3's large language model (LLM) 120 that generated incorrect database statement 131 shown in FIGS. 1-2. Computer 100 may be one or more computers (not shown) such as a rack server such as a blade, a personal computer, a mainframe, or a virtual computer. Components 121, 123-124, and 140 may be respectively stored and operated in volatile or nonvolatile storage of computer 100.

Computer 100 contains and operates a machine learning (ML) pipeline that implements shown steps 0, L, and 1-6 that may occur in sequence. FIG. 1 shows an embodiment in which same general-purpose LLM 121 performs both steps 1-2. FIG. 2 instead shows an embodiment in which distinct LLMs 121 and 222 perform respective steps 1-2 as discussed later herein.

1.1 Natural Language (NL) Generation (NLG)

Generative natural language (NL) processing (NLP) is referred to herein as NL generation (NLG). The LLMs in FIGS. 1-2 each performs respective one or a few NLG functions that each is a specialization of a respective general kind of NLG function. Herein, a prosaic function is a general NLG function that primarily or exclusively generates prose (i.e. NL, e.g. a natural sentence or natural paragraph). A prosaic function may be referred to herein as an NL-to-NL (NL2NL) function.

Rephrasing and log summarization are prosaic functions that are performed by some LLMs in computer 100 as discussed later herein. Code generation and text augmentation are non-prosaic general NLG functions that are performed by some LLMs in computer 100 as discussed later herein.

In an embodiment at step 0, target LLM 120 performs code generation NLG that inferentially generates incorrect database statement 131 that is text that may, for example, be structured query language (SQL). This code generation may be referred to herein as NL-to-SQL (NL2SQL) or text-to-SQL (text2SQL).

With general NLG, question answering (Q&A) is prosaic. Herein, question answering instead is non-prosaic because, with NL2SQL, answers are query results, and query results are not NL. That is, NL2SQL and NL2NL provide different answers.

1.2 Target LLM

The following is an example database statement 131 that is incorrect because literal 2M should be 2000000 that is numeric instead of alphanumeric shorthand, even though both mean two million. For example in standard SQL, 3000000>'2000000' is an expression that cannot be parsed.

```
SELECT * FROM MOVIE_STREAM_PROJECTS WHERE
MARKET_UNIT = 'MU1' AND ACTUAL_REVENUE > '2M'
```

In other words, components 120 and 131 may be inaccurate, and finetuning herein increases the accuracy of target LLM 120. The lifecycle of target LLM 120 entails a sequence of phases that are pretraining, finetuning, and deployment. Herein, finetuning entails generating and using a finetuning corpus, where corpus generation entails a sequence of steps L and 1-5, and then step 6 uses the finetuning corpus to retrain target LLM 120. Computer 100 performs finetuning. Pretraining and deployment may be performed by computer 100 or another computer.

For example: a) target LLM 120 may be received already pretrained by a third party supplier, b) computer 100 may be in a laboratory environment, and c) in a production environment, target LLM 120 may eventually be deployed into a program for a database, such as a software application for an end user or a tool for a developer or administrator. The purpose of target LLM 120 is to provide translation of an ad-hoc NL request to facilitate interactive operation of the database under the direction of a person who may, for example, not be required to write or review formal database statements because target LLM 120 can generate such database statements.

ML pipeline steps 0 and 1-5 are shown in FIGS. 1-2. Depending on the embodiment, step 0 is performed by computer 100 or earlier on a different computer or both. That is although step 0 occurs, whether computer 100 implements step 0 depends on the embodiment.

Although both computers may contain and operate a respective distinct ML pipeline, only the ML pipeline in computer 100 implements steps 1-5. For example, computer 100 may be in a software laboratory, and an earlier computer may be in a production environment. In an embodiment not shown, computer 100 neither contains nor operates the database nor target LLM 120.

For example in the production computer, target LLM 120 may already have, during step 0 before operation (or existence) of computer 100, inferentially generated one or many incorrect database statements 131 that computer 100 can receive and, as follows, analyze. In one scenario, a system administrator selects multiple distinct incorrect database statements 131 that appear to be distinct manifestations of a same generative defect. That is, multiple distinct incorrect database statements 131 may, for example, exhibit a same problem.

For example in the production computer, target LLM 120 may already, during step 0 before operation of computer 100, have inferentially generated one or many incorrect database statements 131 that computer 100 can receive and, as follows, analyze. In one scenario, a system administrator selects multiple distinct incorrect database statements 131 that appear to be distinct manifestations of a same generative defect. That is, multiple distinct incorrect database statements 131 may, for example, exhibit a same problem.

Why database statement 131 is incorrect depends on the embodiment or scenario. In one example, incorrect database statement 131 violates standard SQL. Other failure modes of incorrect database statement 131 are discussed later for FIG. 2. All kinds of generative failures may be subsequently prevented by step 6 that finetunes target LLM 120.

Natural language request 110 is text that may consist of any of a multiword natural phrase or sentence or a multi-sentence natural paragraph. In an embodiment, target LLM 120 accepts natural language request 110 as input in the form of a sequence of lexical tokens that target LLM 120 contextually analyzes. For example, ordering of tokens in the sequence affects analysis by target LLM 120.

In an embodiment, one, some, or all of the LLMs in FIGS. 1-2 may be a respective deep neural network (DNN) that may be an implementation of bidirectional encoder representations for transformers (BERT). An NLP transformer is a subsequence of neural layers that perform contextual analysis within a first span of attention that may, for example, simultaneously cover the entire sequence of lexical tokens and within a smaller second span of attention that simultaneously covers only a subsequence of the lexical tokens.

1.3 Sequence of Multiple Distinct LLMS in Pipeline

The sole purpose of LLMs 121 and 123-124 is to generate a finetuning corpus for target LLM 120. As discussed later herein: a) LLM 121 is referred to as an insights LLM, and b) LLM 124 is referred to as a verifier LLM. Every LLM herein accepts a respective distinct linguistic prompt as input in the form of a sequence of lexical tokens. That is, an identical prompt is never accepted in two distinct steps of steps 0 and 1-5 nor by two distinct LLMs. In other words, operation of the ML pipeline entails a sequence of distinct prompts that may be referred to herein as a prompt chain. Here, a distinct prompt at each of steps 0 and 1-5 includes example prompts later herein that may for example: a) be based on results generated by interpretation of other prompts by earlier steps or b) contain a portion of a prompt already interpreted by an earlier step.

FIG. 1 also shows step L that begins finetuning corpus generation and step 6 that retrains target LLM 120. Without using an LLM, step L preloads historic data 110, 131, and 190 into computer 100. The following example tables A-C in a relational database are example database tables into which step L may insert new rows. Step L automatically or manually populates the following tables with automatically or manually generated content as discussed below. In an embodiment, example tables A-C are manually prepopulated, and computer 100 inserts additional new rows into example table B as discussed later herein.

The following example table A enumerates two distinct natural language problems that each is represented by a distinct table row that contains a description of a distinct technical problem that target LLM 120 failed to overcome by generating incorrect database statement 131. In other words, incorrect database statement 131 is an example of that technical problem. In the following example table A, column issue_id is a primary key, and column issue_description contains descriptions of distinct technical problems, and each problem description is a natural language sentence or paragraph that describes a distinct failure mode or failure symptom of target LLM 120.

| issue_id | issue_description |
|---|---|
| issue_00 | The model references columns that do not exist or that exist in a different table |
| issue_01 | The model consistently utilizes incorrect join conditions, linking tables based on |

In an expert embodiment, a human expert such as a system administrator, database administrator, data scientist, or software developer manually recognizes a recurring problem in operational logs caused by various distinct but similar incorrect database statements 131 that were generated by target LLM 120. The expert may hand draft each problem description in above example table A.

Herein, an NL problem is a problem description and may be referred to as an issue, an issue description, an issue statement, or a problem statement. An NL problem consists of descriptive NL that briefly describes a technical problem (i.e. malfunction of target LLM 120) that was caused by problematic NL (e.g. NL request 110).

1.4 Log Summarization

Step 1 and LLM 121 are prosaic (i.e. generate prose) in function as follows. As discussed later for FIG. 2, rephrasing is the primary prosaic function of LLM 121. In a log summarization embodiment of step 1: a) log summarization is an additional prosaic function performed by LLM 121, and b) example table A also contains column issue_explanation that is shown in NL problem 190 but unshown in above example table A. For example, NL problem 190 may be a row in example table A.

Log summarization by step 1 uses one, some, or all of the following historical or live documents that were obtained by computer 100 or another computer during or before step 0 or L: operational logs, trouble tickets, and emails. Herein, a log consists of log entries, and a log entry may be: a line of text in a logfile such as a console log, a row in a database table or spreadsheet, or an individual email or trouble ticket. For example, a log entry may contain some or all of: NL request 110, incorrect database statement 131, a timestamp, a stack trace of an exception, an error message, an error code, and a result code.

In an embodiment: a) few or many log entries are manually identified in step L as distinct (i.e. corroborating) examples of same NL problem 190, and b) LLM 121 summarizes (i.e. inferentially generates a summary of) those corroborating examples in step 1. Column issue_explanation contains that summary.

The following is example template A that can be used to generate a linguistic prompt that LLM 121 may accept as input. Example template A contains % (i.e. percent) characters, and each pair of percents delimits a placeholder that is a variable into which dynamic data may be inserted when the template is instantiated. In this template, 'examples' are multiple examples that exhibit same NL problem 190 that is referred to in this template as model_issue. All of these 'examples' will together be inserted into the same linguistic prompt. Each of the multiple examples may have a (e.g. distinct or not) respective database schema. This example template A refers to LLMs 120-121 respectively as a custom LLM model and you, and refers to user 150 as I.

```
I trained a custom LLM model to perform NL2SQL{% if model_issue
!= '' %}, however, {{model_issue}}{% endif %}.
The goal will be to explain what general pattern is exhibited
in the NL prompts that leads to my model making mistakes.
The examples are only there to illustrate the issue but do not
focus too much on them, you should provide a general
explanation.
{% for _, example in examples.iterrows( ) -%}
Example{% if examples|length >
1 %} {{loop.index}}{% endif %}
SQL Schema:
```sql
{{ example["schema_description"] }}
```
NL: {{example['nl_prompt']}}
Ground truth: {{ example["ground_truth_answer"] }}
My model's prediction (wrong): {{ example["model_answer"] }}
{% endfor -%}
Please explain what general pattern is exhibited in the NL
prompts that leads to my model making mistakes. The examples
are only there to illustrate the issue but do not focus too
much on them, you should provide a general explanation.
Make sure to focus on describing the general issue clearly and
succinctly. Do not conjecture how such issues could be
mitigated.
Please ensure that throughout the explanation you are always
using one specific SQL dialect which is : {{ used_dialect }}.
Assistant:
```

1.5 Log Summarization

The following example table B enumerates two distinct incorrect database statements 131 in column model_answer. In the following example table B, column ground_truth_answer are (e.g. manually) corrected database statements 131 that would not cause the technical problem. Column nl_prompt contains respective natural language requests 110 that caused the technical problems. Column issue_id is a foreign key into above example table A. Column schema_id is a foreign key that identifies relational database schemas of databases to which the prompts were directed as discussed later for FIG. 2. In an embodiment: a) example table B is manually prepopulated so that column model_answer consists of actually observed incorrect database statements 131, and b) computer 100 generates and inserts additional new rows into example table B as discussed later herein. Here, inserting additional rows means generating a finetuning corpus. That is, the following example table B becomes the finetuning corpus.

| issue_id | schema_id | nl_prompt | ground_truth_answer | model_answer |
|---|---|---|---|---|
| issue_00 | schema_1 | What are the Package Options or the TV Channels whose series names are Sky Radio? | SELECT Package_Option FROM TV_Chanrl8 WHERE series_name = "Sky Radio"; | SELECT TV_Channel.Package_Option FROM TV_Channel JOIN TV_series ON TV_Channel.id = TV_series.Channel WHERE TV _series.series_name = 'Sky Radio'; |
| issue_01 | schema_0 | How much surlace area do the countires in the Carribean cover together? | SELECT sum(SurlaceArea) FROM country WHERE Region = "Caribbean' | SELECT SUM(c.SurfaceArea) FROM country c JOIN countrylanguage cl ON c.Code = cl.CountryCode WHERE c.Continent = 'Caribbean'; |

In the expert embodiment, the human expert manually recognizes a recurring problem in operational logs caused by various distinct but similar incorrect database statements 131 that were generated by target LLM 120. The expert may hand draft each problem description in above example table A.

1.6 Hint Generation

FIG. 1 shows that learned steps 1-2 involve "issues" that, as discussed for above example table 2, are occurrences of NL problem 190 that is discussed later herein. Step 1 is discussed later for FIG. 2. Step 2 inferentially generates engineering design directives, such as NL hint 280 for technical requirement 250 that are shown in FIG. 2, that will be used to demonstrate successful and unsuccessful ways to fulfill natural language request 110. In FIG. 1, step 2 says "a plan", which is not an execution plan of a database statement. For example herein, a plan may be an unordered set of distinct NL hints 280. Later herein, each row in the hints column of hints 400 in FIG. 4 is a plan.

Unlike general purpose LLMs 121 and 124 that were pretrained with a general-purpose (i.e. prosaic) training corpus, code LLM 123 was instead pretrained with a training corpus that contained SQL. In step 3, code LLM 123 generates new NL requests and, for each new NL request, generates a corresponding correct or incorrect database statements that would successfully or unsuccessfully fulfill the NL request for various respective database schemas as discussed later herein.

In step 4, general purpose LLM 124 detects: a) whether the NL request generated by step 3 is an accurate adaptation of NL request 110 that implicates or addresses the same technical problem for a different database schema and b) whether the database statement generated by step 3 is incorrect (i.e. would cause the technical problem) or correct (i.e. would not).

2.0 More Example Linguistic Prompts in NLG Pipeline

FIG. 2 is a block diagram that depicts example computer 100 that generates finetuning dataset 140 for large language model (LLM) 120 that generates incorrect database statement 131. All of the components shown in FIG. 2 may be stored and operated in volatile or nonvolatile storage of computer 100.

Why database statement 131 is incorrect depends on the embodiment or scenario. In an example discussed later herein, incorrect database statement 131 conforms to standard SQL but violates SQL dialect 275, and computer 100 may finetune target LLM 120 for dialect 275. In another example, incorrect database statement 131 violates standard SQL. In another example, incorrect database statement 131 violates semantics of database schema 241. For example, incorrect database statement 131 may have fully executed but with an incorrect result. All of those example generative failures may be subsequently prevented by finetuning target LLM 120 herein.

The sole purpose of LLMs 121, 123-124, 222, and 225 is to generate a finetuning corpus for target LLM 120. As discussed later herein: a) LLM 222 is referred to as an insight LLM, and b) LLM 225 is referred to as a rephrase LLM. For example, correct database statement 232 is inferred by LLM 123 from linguistic prompt 270 that may be larger, more complex, and contain more information than NL request 110 that incorrect database statement 131 was inferred from by target LLM 120. Likewise, database schema 241 may be larger and more complex than database schema 242.

For example, portions of some or all prompts at steps 1-5 may be identical. Although only linguistic prompt 270 is shown, which only LLM 123 accepts, herein one, some, or all of other LLMs 121, 124, 222, and 225 may accept a prompt that contains a portion that linguistic prompt 270 also contains. For example, prompts of some or all of steps 1-5 may contain dialect 275 that is an identifier (i.e. name) of a vendor-specific dialect of SQL that extends or conflicts with standard SQL in a way that may confuse (i.e. decrease accuracy of) target LLM 120, which may necessitate finetuning of target LLM 120 herein. For example, dialect 275 may identify a particular version (i.e. release) of a dialect.

Likewise, prompts of some or all of steps 1-5 may contain text that is or is derived from a database schema, such as a portion or entirety of a SQL relational schema or a transformation of such schematic details into a semi-structured document such as JavaScript object notation (JSON) or extensible markup language (XML).

The following example table C enumerates two distinct relational schemas that may, for example, be database schemas 241-242, and each schema is represented by a distinct table row that contains a structured description of a distinct schema. In the following example table C, column schema_id is a primary key, and column schema_description contains names of table columns and names, columns, and primary and foreign keys of database tables. For example table city has foreign key column CountyCode that corresponds to (e.g. can be relationally joined with) primary key column Code in table country as shown in the following example table C.

| schema_id | schema_description |
|---|---|
| schema_0 | Table: city, Columns: IO, Name, CountryCode, District, Population<br>Table: country, Columns: Code, Name, Continent, Region, SurfaceArea, IndepYear, Population, LifeExpectancy, GNP, GNPOld, LocalName, Governmentform, HeadOfState, Capital, Code2<br>Table: countrylanguage, Columns: Count ryCode, Language, IsOfficial, Percentage<br>Primary keys: city.IO, country.Code, countrylanguage.CountryCode<br>foreign keys: city.CountryCode -> country.Code, countrylanguage.CountryCode -> country.Code |
| schema_1 | Table: TV_Channel, Columns: id, series_name, Country, Language, Content, Pixel_aspect_ratio_pAR, Hight_definition_TV, Pay_per view_PPV, Package_Option<br>Table: TV_series, Columns: id, Episode, Air_Date, Rating, Share, 18_49_Rating_Share, Viewers_m, Weekly_Rank, Channel<br>Table: Cartoon, Columns: id, Title, Directed_by, Written_by, Original_air_date, Production_code, Channel<br>Primary keys: TV_Channel.id, TV_series.id, Cartoon.id<br>Foreign keys: TV_series.Channel -> TV_Channel.id, Cartoon.Channel -> TV_Channel.id |

Earlier example table A enumerates two distinct natural language problems 190 that each contains a description of a distinct technical problem that target LLM 120 failed to overcome by generating incorrect database statement 131. The issue_description of NL problem 190 is shown as NL problem 290 that is a hand-drafted NL sentence or paragraph that describes a distinct failure mode or failure symptom of target LLM 120. To increase accuracy of some or all of subsequent steps 2-5, LLM 121 rewords and rephrases NL problem 290 to inferentially generate problem restatement 295 that may, for example, be clearer or have more context or background than NL problem 290. For increased accuracy, problem restatement 295 may be inserted into a respective linguistic prompt accepted by any of LLMs 123-124, 222, and 225.

In step 2, LLM 222 inferentially generates engineering design directives, such as NL hint 280 for technical requirement 250. Technical requirement 250 is a software engineering concern that, if unlearned or inaccurately learned by target LLM 120, causes database statement 131 to be incorrect for database schema 241. There may be multiple technical requirements 251-252 of distinct kinds, for which technical requirement 250 may be a generalization as discussed elsewhere herein.

2.1 Example Hint Generation Prompt

The following is example template B that can be used to generate a linguistic prompt that LLM 222 may accept as input. Herein, a template may contain two kinds of placeholders: a) those that are replaced with values during template instantiation (i.e. prompt generation) as discussed above and b) those that remain unchanged in the generated prompt. In a template, (b) is delimited by a pair of solitary angle brackets, and the LLM learns to replace that placeholder with inferred values such as a hint in the following example template B.

```
I trained a custom LLM model to perform NL2SQL{% if
issue_description != '' %}, however, {{issue_description}}
{% endif %}.
Here is an explanation of what might be the problem for the
model:
{{issue_explanation}}
Give {{num_samples}} hints of how to potentially make SQL
queries that would trigger the issue on the following schema
description:
‘‘‘sql
{{schema_description}}
‘‘‘
Your examples should follow the following template:
* Hint: <A hint about how to trigger the issue with this SQL
  schema>
Make sure to not write any code and just use detailed natural
language descriptions of code including table and column names
and relevant SQL keywords.
Please make sure to only follow one specific SQL
dialect which is : {{ used_dialect }}. Assistant:
* Hint:
```

Between steps 2-3, linguistic prompt 270 is dynamically generated, but other prompts are dynamically generated at earlier or later times. That is, prompts in the prompt chain are not simultaneously generated together. As discussed earlier herein, even though the prompt chain is a sequence of distinct prompts, a linguistic prompt accepted by any of LLMs 123-124, 222, and 225 may share some reused portions.

A linguistic prompt accepted by any of LLMs 123-124, 222, and 225 may contain a database schema, as discussed for above example table C, which may be: a) database schema 241 that incorrect database statement 131 is based on or b) a different schema such as database schema 242. Thus, steps 2-5 may be repeated with different schemas to increase finetuning corpus diversity as discussed elsewhere herein.

2 Example Prompt that Contains Hint

In step 3, LLM 123 inferentially generates components 210 and 232 as follows. Synthetic request 210 is a natural sentence or paragraph that more or less is a translation of NL request 110 from database schema 241 to database schema 242.

In step 3, LLM 123 generates exactly one or two database statement(s) 232 as follows. In an embodiment, generating linguistic prompt 270 entails inserting, into linguistic prompt 270, exactly one NL hint 280 for exactly one technical requirement 250 as shown in the following example template C that can be used to generate linguistic prompt 270 that LLM 123 may accept as input.

```
I trained a custom LLM model to perform NL2SQL{% if
issue_description != '' %}, however, {{issue_description}}
{% endif %}.
The goal will be to generate some SQL queries to fine-tune my
model illustrating the issue, for a given SQL schema
description{% if issue_schema_hint != '' %}, following some
provided hints{% endif %}.
Here is an explanation of what might be the problem for the
model:
{{issue_explanation}}
Your examples should use the following schema description:
‘‘‘sql
{{schema_description}}
‘‘‘
```

-continued

```
{% if issue_schema_hint != '' %}Here are some hints about how
to make SQL queries triggering the issue on that schema:
{{issue_schema_hint}}{% endif %}
Taking the above explanations and hints into account, generate
a list of {{num_samples}} NL2SQL examples that could lead my
model to making mistakes on the schema.
The examples you generate should follow only one specific
dialect which is {{ used_dialect }}.
Your examples should follow the following template:
Example 1:
NL: <your NL prompt>
Ground truth: ‘‘‘sql<the ground truth SQL query that answers
the prompt>‘‘‘
My model’s prediction (wrong): ‘‘‘sql<provide an SQL query
that could be my model’s prediction which exhibits the issue
described above>‘‘‘
Assistant:
Example 1:
```

2.3 Multiple Verification Criteria

Database statement 232 could successfully or unsuccessfully handle technical requirement 250 with database schema 242. For example, linguistic prompt 270 may specify whether database statement 232 should be correct or incorrect when generated by step 3, which does not mean that database statement 232 actually is correct or incorrect as desired unless verified by step 4 as discussed earlier herein. For example, a particular pair of generated components 210 and 232 that fails verification by step 4 may be discarded.

In one example in one inference, LLM 123 generates two database statements 232 and, if LLM 123 is accurate, the two statements are one correct statement and one incorrect statement. LLM 124 is separately invoked for each of the correct and incorrect statements. Which linguistic prompt should LLM 124 accept depends on whether the correct or incorrect statement will be contained in the prompt.

The following is example template D1 that can be used to generate a linguistic prompt that LLM 124 may accept as input that contains a database statement that is supposed to be a correct statement, and this database statement succeeds verification only if the database statement actually seems correct to LLM 124, which does not entail execution of the database statement.

```
I trained a custom LLM model to perform NL2SQL{% if
issue_description != '' %}, however, {{issue_description}}
{% endif %}.
Considering the schema description and the following example, is
the Ground truth a valid SQL query and is it correct with
regards to the NL prompt?
Your reply should be a simple Yes or No.
SQL Schema:
‘‘‘sql
{{schema_description}}
‘‘‘
Example:
NL: {{nl_prompt}}
Ground truth:
‘‘‘sql{{good_reply}}
‘‘‘
Assistant:
```

The following is example template D2 that can be used to generate a linguistic prompt that LLM 124 may accept as input that contains a database statement that instead is supposed to be an incorrect statement, and this database statement succeeds verification only if the database statement actually seems incorrect to LLM 124, which does not entail execution of the database statement.

```
I trained a custom LLM model to perform NL2SQL{% if
issue_description != '' %}, however, {{issue_description}}
{% endif %}.
Considering the provided SQL schema description and the
following example, does the NL prompt and the model's wrong
prediction exhibit the pattern mentioned in the issue?
Here is a recap of the issue:
{{issue_explanation}}
Your reply should be:
- Yes if the model's prediction is incorrect and it exhibits the
  mentioned issue
- No if the model's prediction is a correct SQL query that
answers the NL prompt or if it does not exhibit the mentioned
issue.
SQL Schema:
'''sql
{{schema_description}}
'''
Example:
NL: {{nl_prompt}}
Ground truth: '''sql{{good_reply}}'''
My model's prediction (wrong):
'''sql{{bad_reply}}''' Assistant:
```

2.4 Question Reformulation

In step 5, LLM 225 rewords and rephrases synthetic request 210 to inferentially generate multiple semantically-equivalent request restatements 215-217 that may, for example, be clearer or have more context or background than synthetic request 210. Rephrasing can add, remove, and replace words. The lengths (e.g. word count) of request restatements 215-217 may, for example, be different. Likewise, a request restatement may be shorter or longer than NL request 110. The following is example template E that can be used to generate a linguistic prompt that LLM 225 may accept as input.

```
I trained a custom LLM model to perform NL2SQL, but I need more
samples.
Please reformulate the provided NL prompt in the
example {{num_reformulations}} times. Make sure
that the generated NL prompts result in the same
Ground truth.
Your response should not include the Ground truth.
SQL Schema:
'''sql
{{schema_description}}
'''
Here is the original NL prompt to reformulate: {{nl_prompt}}
And here is the ground truth SQL query for the NL prompt:
{{good_reply}}
Your {{num_reformulations}} reformulations
should follow the following template: NL:
<your reformulated NL prompt>
NL: <another
reformulation>
({{num_reformulations}
} times)
Assistant:
NL:
```

In an embodiment, detection step 4 is more analytically complex than generative step 5. For example, LLM 124 may be more complex (e.g. more neurons or neural layers) than LLM 225. In an embodiment, LLM 124 contains more neural connection weights than LLM 225.

All of steps 0, 3, and 5 generate new training datapoints. In an embodiment, a datapoint is a tuple that contains some or all of the following: a) a correct database statement, b) an incorrect database statement, c) a database schema, d) an NL request, whether manual (i.e. hand drafted) or synthetic (i.e. generated by computer 100 as discussed above), and e) an NL problem, whether manual or synthetic. A datapoint does not contain components 250-252, 270, and 280.

A new datapoint generated by any step may be verified by step 4 that verifies: a) the tuple's correct database statement appears correct, b) the tuple's incorrect database statement appears to be an example of NL problem 290, and c) if the tuple's NL request is synthetic request 210, then synthetic request 210 appears able to cause NL problem 290 with target LLM 120 and other database schema 242.

In an embodiment, a new datapoint generated by step 3 or 5 that fails verification by step 4 is discarded, and any new datapoint that is not discarded may be added to curated finetuning dataset 140. Thus, steps 3-5 provide various innovative ways to generate a finetuning corpus of high quality as ensured by step 4.

In an embodiment, computer 100 contains target LLM 120, and each of distinct request restatements 215-217 may be processed by target LLM 120 to inferentially generate a new database statement. If the new database statement is different from (e.g. correct or incorrect) database statement 232, then: a) a datapoint is not generated for request restatement 215, and b) request restatement 215 and the new database statement are discarded. If the new database statement is the same as database statement 232, then a new datapoint is generated that contains request restatement 215 and the new database statement, and the new datapoint may be added to curated finetuning dataset 140.

3.0 Example Original, Synthetic, and Reformulated Questions

FIG. 3 is a block diagram that depicts example NL questions 300 that may be stored and operated in volatile or nonvolatile storage of computer 100. Each row shown in NL questions 300 is a distinct question pair that is a distinct combination of two precise NL questions in the shown NL prompt and base NL prompt columns. In one example in question pair 310, the base NL prompt may be NL request 110, and the NL prompt may be a corresponding request restatement generated by LLM 225. In another example in question pair 310, the base NL prompt may be synthetic request 210, and the NL prompt may be request restatement 215. From each row in NL questions 300 is generated a distinct respective datapoint in curated finetuning dataset 140. These new datapoints increase the diversity of curated finetuning dataset 140, which increases the accuracy of target LLM 120.

4.0 Example Hints

FIG. 4 is a block diagram that depicts example hints 400. Hints 400 may be generated by either of steps 3-4. Each row in hints 400 represents a distinct datapoint as follows.

The primary key of hints 400 may consist of three columns that are shown issue_id and schema_id columns as discussed earlier herein and shown NL problem column that contains original and restated NL problems, including NL problems 290 and 295 that describe a same technical problem. Because each row has a distinct value in the NL problem column, each shown row has a distinct value in the hints column. In other words, changing how a problem is described in NL may or may not change which hints are generated.

Each value in the hints column is a text string that is a compound value that aggregates multiple hints. Each shown row contains three distinct hints. Thus, hints 400 shows two rows and six distinct hints, including hints 381-382.

As shown, each hint is a natural sentence or paragraph that begins with a * (i.e. asterisk). Each hint contains a pedantic database statement that applies the hint based on the identified schema. The pedantic database statement is small because it is not configured to fulfil NL request 110.

Each pedantic database statement begins with the shown prefix '''sql (i.e. three apostrophes).

5.0 Example Corpus Generation and Finetuning Process

Figure 5:
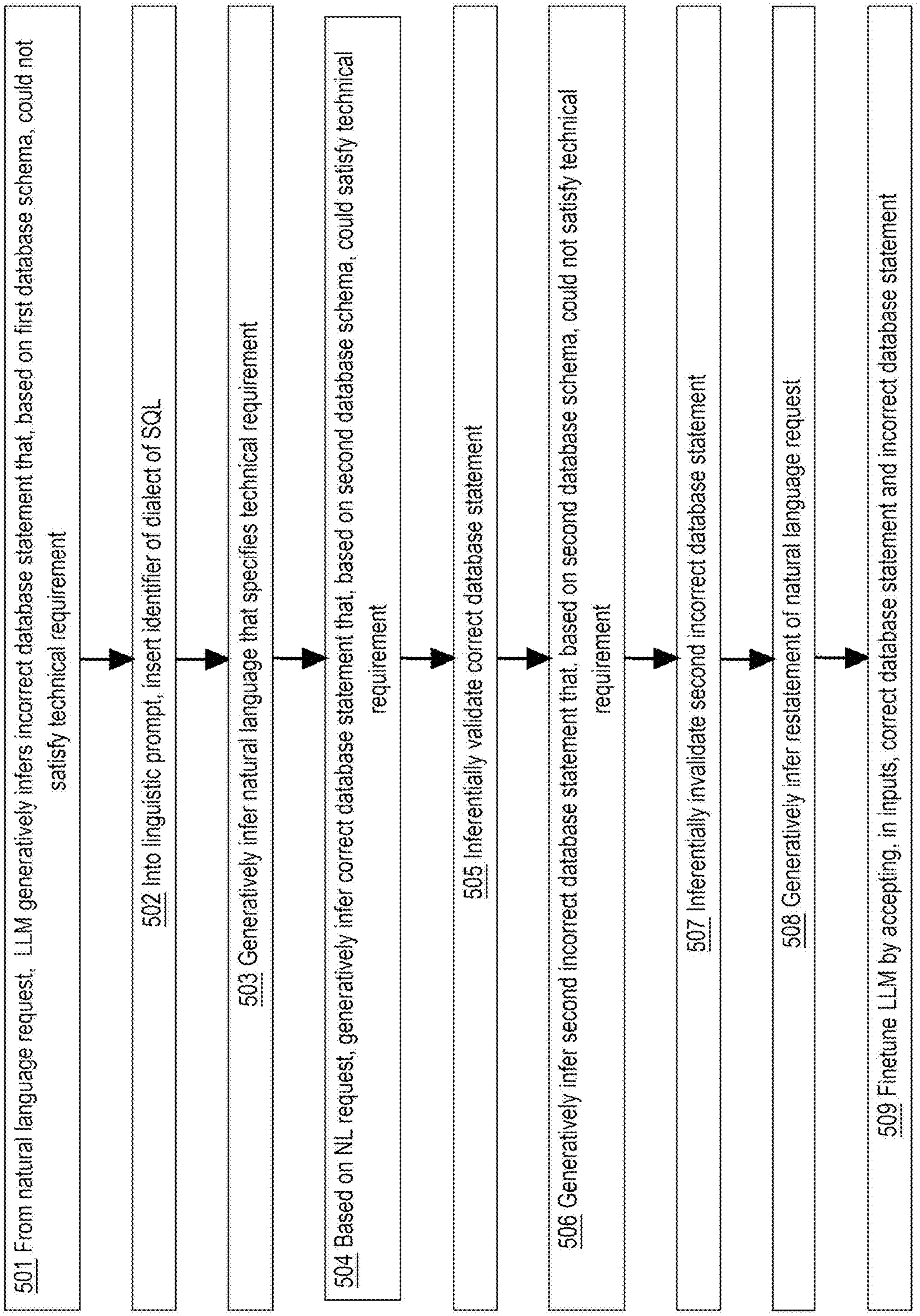
FIG. 5 is a flow diagram that depicts an example computer process that generates and uses a curated finetuning dataset to finetune a target LLM.

FIG. 5 is a flow diagram that depicts an example process that computer 100 may perform to generate and use curated finetuning dataset 140 to finetune target LLM 120. In embodiments discussed earlier herein, steps such as 501 and 509 may instead be performed by a different computer in a different environment at a different time than steps 502-508. In an embodiment, computer 100 performs all of the steps of the process of FIG. 5 without accessing a database configured with either of database schemas 241-242.

Steps 0, 1-6, and L in FIG. 1 correspond to steps shown in FIG. 5 as follows. From NL request 110 in step 501, target LLM 120 generatively infers incorrect database statement 131 that, based on database schema 241, could not satisfy technical requirement 250. Step 501 is step 0 in FIG. 1. Step L in FIG. 1 occurs between steps 501-502.

Adding new datapoints to curated finetuning dataset 140 entails steps 502-508 as follows. As discussed earlier herein, one, some, or all of LLMs 123-124, 222, and 225 accept an input that is a linguistic prompt that may, for example, contain a database schema. Into a linguistic prompt to be accepted by LLM 222 as input, step 502 inserts either or both of database schema 242 and dialect 275.

In a single inference in step 503, LLM 222 generates one or a few NL hints 280, and each NL hint 280 may be NL that describes a distinct respective technical requirement 250 as discussed earlier herein.

Based on either of NL problems 290 or 295, LLM 123 in step 504 generatively infers a first correct database statement 232 that, based on other database schema 242, could satisfy technical requirement 250 as discussed earlier herein. LLM 124 in step 505 inferentially validates the correctness of correct database statement 232 as discussed earlier herein. Conversely, LLM 123 in step 506 generatively infers a second incorrect database statement 232 that, based on other database schema 242, could not satisfy technical requirement 250 and, in that case, LLM 124 in step 507 inferentially invalidates the correctness of the second incorrect database statement 232.

Steps 505 and 507 each detects whether or not an inferentially-generated database statement is correct, and this detection is an inference by LLM 124 that is referred to herein as validation. Step 508 is step 5 in FIG. 1 that generatively infers request restatement 215 from a linguistic prompt that contains NL request 110.

In an embodiment discussed earlier herein, computer 100 contains target LLM 120, and each one of distinct request restatements 215-217 may be processed by target LLM 120 to inferentially generate a new database statement. If the new database statement is different from incorrect database statement 131, then: a) a datapoint is not generated for request restatement 215, and b) request restatement 215 and the new database statement are discarded. If the new database statement is the same as incorrect database statement 131, then a new datapoint is generated that contains request restatement 215 and the new database statement, and the new datapoint may be added to curated finetuning dataset 140.

Satisfaction of both of steps 505 and 507 is a prerequisite to adding the new datapoint to curated finetuning dataset 140, in which case step 509 finetunes target LLM 120 by target LLM 120 accepting, in (e.g. separate) inputs, the correct database statement and the incorrect database statement as discussed earlier herein.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11*g*. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.1 Query Processing

A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
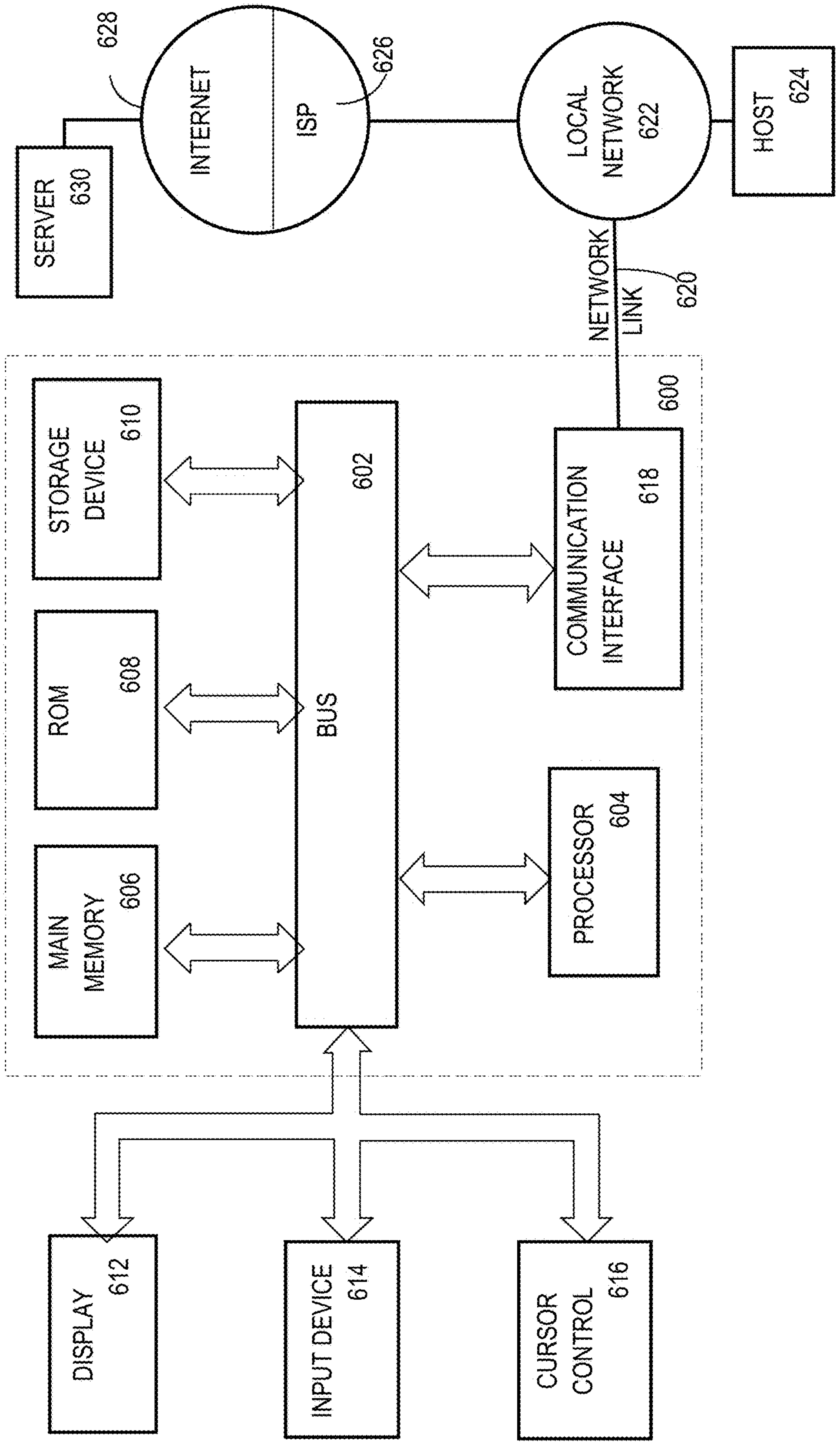
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
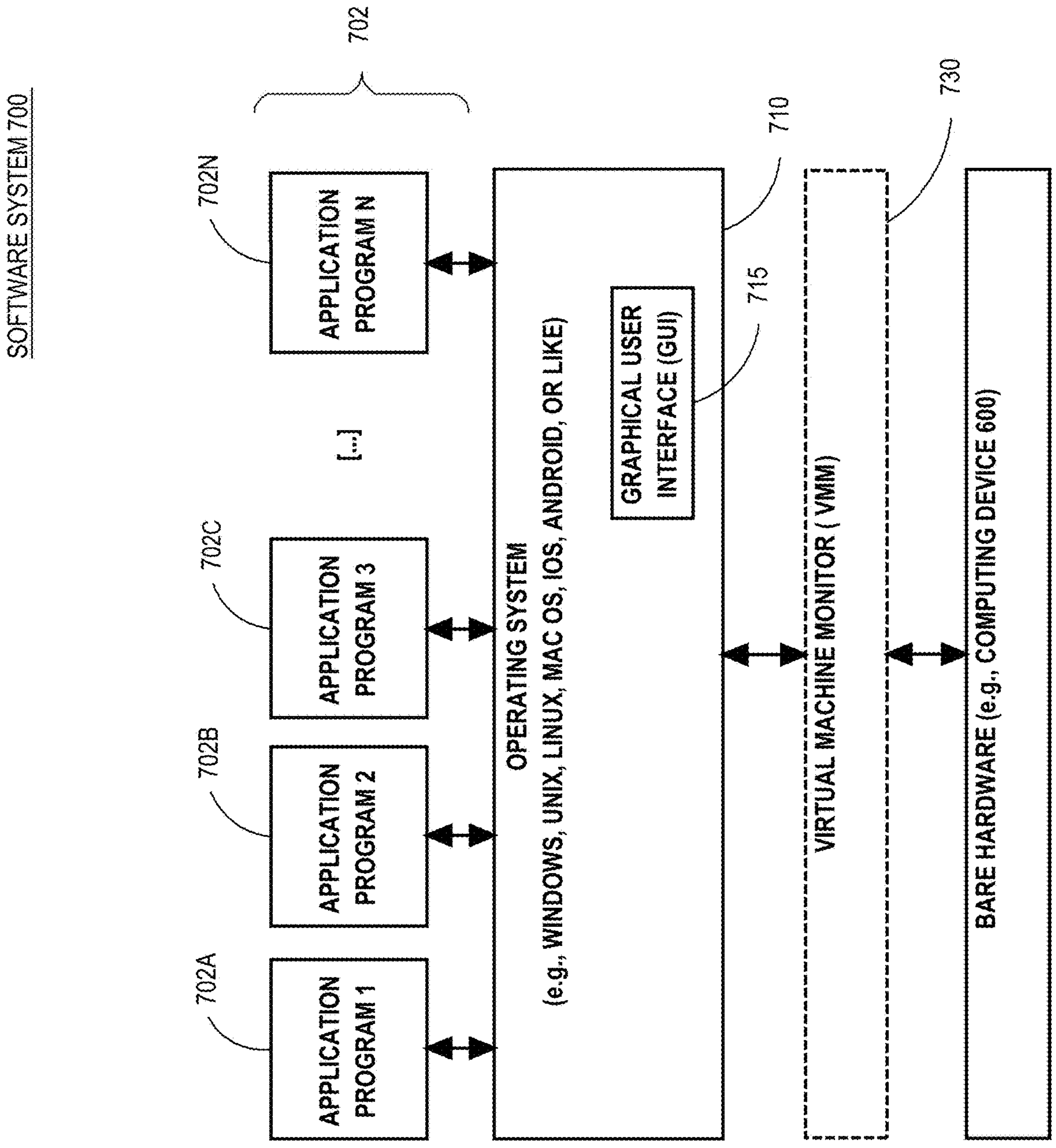
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N [L−1] and N [L], respectively, the dimensions of matrix W is N [L−1] columns and N [L] rows.

Biases for a particular layer L may also be stored in matrix B having one column with N [L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

generating, by a large language model, from a natural language request, an incorrect database statement that, based on a first database schema, could not satisfy a technical requirement;

generating, based on the natural language request, a correct database statement that, based on a second database schema, could satisfy the technical requirement;

inferring, for the second database schema, a restatement of the natural language request; and supervised finetuning the large language model by:

a) accepting, in an input to the large language model, the restatement of the natural language request, b) inferentially generating, by the large language model in response to said accepting, a new database statement, and c) backpropagating a nonzero error through the large language model in response to the new database statement being different from said correct database statement;

wherein the method is performed by one or more computers.

2. The method of claim 1 further comprising generating natural language that specifies the technical requirement.

3. The method of claim 2 wherein:

the method further comprises inserting, into a linguistic prompt, natural language that specifies the technical requirement;

said generating the correct database statement comprises a second large language model accepting the linguistic prompt as input.

4. The method of claim 3 wherein said generating the restatement of the natural language request is performed after said accepting the linguistic prompt as input.

5. The method of claim 2 wherein:

the method further comprises inserting, into a linguistic prompt, an identifier of a dialect of standard query language (SQL);

a step comprises a second large language model accepting the linguistic prompt as input;

said step is at least one selected from a group consisting of said generating the natural language that specifies the technical requirement and said generating the correct database statement.

6. The method of claim 1 wherein said generating the restatement of the natural language request comprises inferring from the natural language request.

7. The method of claim 1 wherein the restatement of the natural language request is longer than the natural language request.

8. The method of claim 1 wherein the technical requirement is not referenced in the restatement of the natural language request.

9. The method of claim 1 performed without accessing a database configured with: the first database schema or the second database schema.

10. One or more non-transitory computer-readable media storing instructions that, when executed by one or more processors, cause:

generating, by a large language model, from a natural language request, an incorrect database statement that, based on a first database schema, could not satisfy a technical requirement;

generating, based on the natural language request, a correct database statement that, based on a second database schema, could satisfy the technical requirement;

inferring, for the second database schema, a restatement of the natural language request; and supervised finetuning the large language model by:

a) accepting, in an input to the large language model, the restatement of the natural language request, b) inferentially generating, by the large language model in response to said accepting, a new database statement, and c) backpropagating a nonzero error through the large language model in response to the new database statement being different from said correct database statement.

11. The one or more non-transitory computer-readable media of claim 10 wherein the instructions further cause generating natural language that specifies the technical requirement.

12. The one or more non-transitory computer-readable media of claim 11 wherein:

the instructions further cause inserting, into a linguistic prompt, natural language that specifies the technical requirement;

said generating the correct database statement comprises a second large language model accepting the linguistic prompt as input.

13. The one or more non-transitory computer-readable media of claim 12 wherein said generating the restatement of the natural language request is performed after said accepting the linguistic prompt as input.

14. The one or more non-transitory computer-readable media of claim 11 wherein:

the instructions further cause inserting, into a linguistic prompt, an identifier of a dialect of standard query language (SQL);

a step comprises a second large language model accepting the linguistic prompt as input;

said step is at least one selected from a group consisting of said generating the natural language that specifies the technical requirement and said generating the correct database statement.

15. The one or more non-transitory computer-readable media of claim 10 wherein the instructions further cause inferentially validating the correct database statement.

16. The one or more non-transitory computer-readable media of claim 15 wherein:

said generating the restatement of the natural language request is performed by a second large language model;

said inferentially validating is performed by a third large language model that contains more neural connection weights than the second large language model.

17. The one or more non-transitory computer-readable media of claim 10 wherein the instructions do not cause accessing a database configured with: the first database schema or the second database schema.

18. The method of claim 1 wherein said generating, by the large language model, the incorrect database statement comprises the large language model inferring structured query language (SQL).

19. The method of claim 9 further comprising inferentially validating the correct database statement.

20. The method of claim 19 wherein:

said generating the restatement of the natural language request is performed by a second large language model;

said inferentially validating is performed by a third large language model that contains more neural connection weights than the second large language model.

21. The method of claim 9 further comprising:

generating a second incorrect database statement that, based on the second database schema, could not satisfy the technical requirement;

inferentially invalidating the second incorrect database statement.

22. The one or more non-transitory computer-readable media of claim 17 wherein the instructions further cause:

generating a second incorrect database statement that, based on the second database schema, could not satisfy the technical requirement;

inferentially invalidating the second incorrect database statement.

* * * * *